United States Patent
Yang

(10) Patent No.: US 8,775,865 B2
(45) Date of Patent: Jul. 8, 2014

(54) METHOD AND APPARATUS FOR SCRUBBING ACCUMULATED DISTURB DATA ERRORS IN AN ARRAY OF SMT MRAM MEMORY CELLS INCLUDING REWRITING REFERENCE BITS

(75) Inventor: Hsu Kai Yang, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 346 days.

(21) Appl. No.: 13/136,292

(22) Filed: Jul. 28, 2011

(65) Prior Publication Data

US 2011/0289386 A1 Nov. 24, 2011

Related U.S. Application Data

(63) Continuation-in-part of application No. 12/456,923, filed on Jun. 24, 2009.

(51) Int. Cl.
G06F 11/00 (2006.01)
G06F 11/10 (2006.01)

(52) U.S. Cl.
USPC ............ 714/6.11; 714/6.1; 714/754; 711/103; 711/106

(58) Field of Classification Search
USPC .............. 714/6.11, 6.1, 6.13, 42, 49, 54, 754; 711/103, 105, 106
See application file for complete search history.

(56) References Cited

U.S. PATENT DOCUMENTS

| | | | |
|---|---|---|---|
| 6,292,869 B1 * | 9/2001 | Gerchman et al. ............ | 711/106 |
| 6,704,230 B1 * | 3/2004 | DeBrosse et al. ............. | 365/201 |
| 7,051,260 B2 * | 5/2006 | Ito et al. ....................... | 714/754 |
| 7,417,900 B2 * | 8/2008 | Rolandi et al. ........... | 365/185.25 |
| 8,255,772 B1 * | 8/2012 | Foley ............................ | 714/764 |
| 8,356,231 B2 * | 1/2013 | Cornwell et al. ............. | 714/764 |
| 2005/0073884 A1 | 4/2005 | Gonzalez et al. | |
| 2009/0070648 A1 * | 3/2009 | Allison et al. ................. | 714/746 |
| 2009/0222915 A1 * | 9/2009 | Challener et al. ............... | 726/21 |
| 2010/0332900 A1 | 12/2010 | Yang | |

FOREIGN PATENT DOCUMENTS

WO WO 2009/025857 2/2009

OTHER PUBLICATIONS

"A Novel Nonvolatile Memory with Spin Torque Transfer Magnetization Switching: Spin-RAM," by M. Hosomi et al., IEEE International.
European Search Report 10792437.5-1960/2446361 Mailed :Nov. 11, 2013, Magic Technologies, Inc.

* cited by examiner

*Primary Examiner* — Joseph Schell
(74) *Attorney, Agent, or Firm* — Saile Ackerman LLC; Stephen B. Ackerman

(57) ABSTRACT

A data scrubbing apparatus corrects disturb errors occurring in a memory cell array, such as SMT MRAM cells. The data scrubbing apparatus activates scrubbing of the data and associated error correction bits based on a number of errors corrected, at a power up of the memory cell array, or a programmed time interval. The data scrubbing apparatus may generate an address describing the location of the memory cells to be scrubbed. The data scrubbing apparatus then commands the array of memory cells to write back the corrected data, the associated error correction bits, and reference bits. The data scrubbing apparatus provides a busy indicator externally during a write back of corrected data.

37 Claims, 12 Drawing Sheets

FIG. 1 – Prior Art

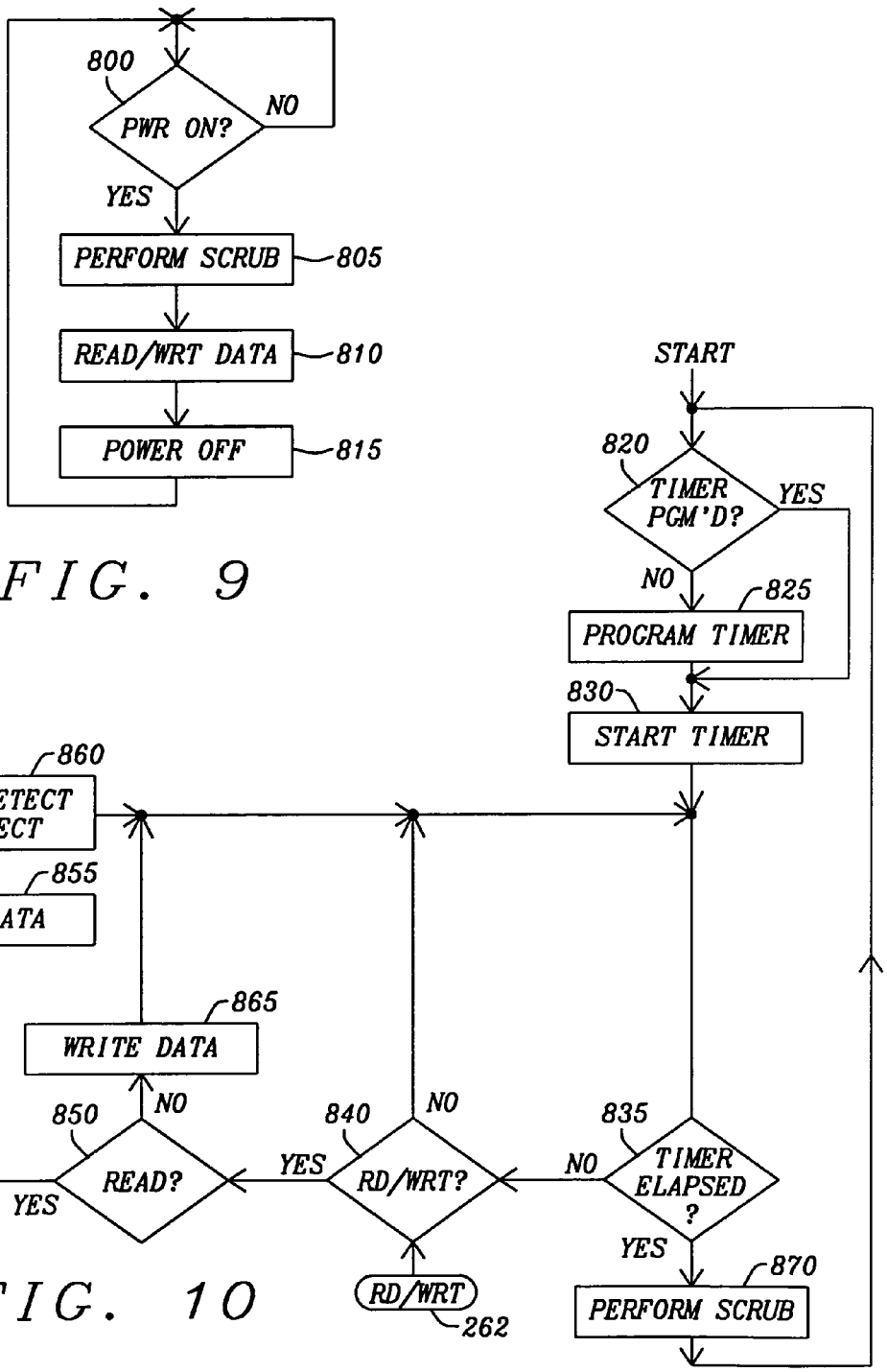

METHOD AND APPARATUS FOR SCRUBBING ACCUMULATED DISTURB DATA ERRORS IN AN ARRAY OF SMT MRAM MEMORY CELLS INCLUDING REWRITING REFERENCE BITS

This is a Continuation-in-Part of application Ser. No. 12/456,923, filed on Jun. 24, 2009, which is herein incorporated by reference in its entirety, and is owned by a common assignee.

BACKGROUND OF THE INVENTION

1. Field of the Invention

This invention relates generally to memory cells and array structures for memory cells. More particularly, this invention relates to magnetic random access memory (MRAM) cells and array structures for MRAM cells. Even more particularly, this invention relates to methods and apparatus for eliminating data errors in spin moment transfer (SMT) MRAM cells and array structures of spin moment transfer (SMT) MRAM cells.

2. Description of Related Art

The term Spin-RAM refers to a magnetic tunnel junction (MTJ) random access memory (RAM). In this context, the term "spin" refers to the angular momentum of electrons passing through an MTJ that will alter the magnetic moment of a free layer of an MTJ device. Electrons possess both electric charge and angular momentum (or spin). It is known in the art that a current of spin-polarized electrons can change the magnetic orientation of a free ferromagnetic layer of an MTJ via an exchange of spin angular momentum.

"A Novel Nonvolatile Memory with Spin-torque Transfer Magnetization Switching: Spin-Ram", Hosomi, et al., IEEE International Electron Devices Meeting, 2005. IEDM Technical Digest. December 2005, pp.: 459-462, provides a nonvolatile memory utilizing spin-torque transfer magnetization switching (STS), abbreviated Spin-RAM. The Spin-RAM is programmed by magnetization reversal through an interaction of a spin momentum-torque-transferred current and a magnetic moment of memory layers in magnetic tunnel junctions (MTJs), and therefore an external magnetic field is unnecessary as that for a conventional MRAM.

A spin-torque MTJ element has two ferromagnetic layers and a spacer layer between the ferromagnetic layers. One ferromagnetic layer is a pinned magnetic layer and the other ferromagnetic layer is a free magnetic layer. The spacer layer is a tunnel barrier layer. When a spin polarized electron flows through the ferromagnetic layers, the spin direction rotates according to the directions of magnetic moment. The rotation of spin direction of the electrons in the ferromagnetic layers are the origin of a spin-torque to the magnetic moment. If the given torque is large enough, magnetization of ferromagnetic layer and thus the magnetic moment is reversed. The magnetization of the ferromagnetic layers transforms from parallel to anti-parallel alignment. This changes the MTJ element from a low resistance state to a high resistance state thus changing the logic state of the MTJ element from a first logic state (0) to a second logic state (1). A voltage source provides the programming voltage that generates the programming current that is reversed appropriately change the programming state of the MTJ element. Reading an SMT MRAM cell involves applying a voltage across the SMT MRAM cell and detecting the resistance (or current) difference. This process is similar to programming the cell only at lower current level and may lead to disturb errors. Disturb errors being permanent errors created by the low current during reading of the SMT MRAM cell.

U.S. Pat. No. 6,704,230 (DeBrosse, et al.) provides a method and apparatus for reducing data errors in a magnetoresistive random access memory (MRAM). Data bits and associated error correction code (ECC) check bits are stored into a storage area. Thereafter, the data bits and ECC check bits are read out and any errors are detected and corrected. A data refresh is then initiated based on a count and data bits and associated ECC check bits stored in the storage area are then refreshed by accessing the stored data bits and the associated ECC check bits. The data bits and their associated ECC check bits are checked, corrected and restored to the storage area.

SUMMARY OF THE INVENTION

An object of this invention is to provide a method and apparatus for eliminating disturb errors occurring in an SMT MRAM array caused during reading an SMT MRAM array.

To accomplish at least this object, a data scrubbing apparatus corrects disturb data errors occurring in an array of memory cells such as SMT MRAM cells. The data scrubbing apparatus receives an error indication that an error has occurred during an operation such as a read operation of a grouping of memory cells within the array of memory cells. The data scrubbing apparatus generates an address describing the location of the grouping of the memory cells within the memory array and the error correction code bits covering the grouping of memory cells that is transferred to the array of memory cells. The data scrubbing apparatus then commands the array of memory cells to write back corrected data to the selected group of memory cells.

The data scrubbing apparatus may further receive provided data to be written to the array of the memory cells as well as the corrected data and transfers the provided data or the corrected data to the array of memory cells.

Based on a scrub threshold value, the data scrubbing apparatus writes the corrected data back to the grouping of memory cells and rewrites associated reference cells upon each receipt of the error indication. Alternately the scrub threshold value may indicate that the data scrubbing apparatus writes the corrected data back and rewrites the associated reference cells after a specific number of errors in the selected group of memory cells. For instance, the specific number of errors specified by the scrub threshold value maybe equal to a number of errors corrected in error correcting within the array of memory cells. In another alternative, the scrub threshold value may indicate that the data scrubbing apparatus writes the corrected data back after each read cycle of the array of memory cells.

The data scrubbing apparatus may further suspend writing back during a writing of data to the array of memory cells. Additionally the data scrubbing apparatus provides a busy indicator externally to the array of memory cells during a write back of corrected data.

In other embodiments, a data scrubbing apparatus has a power initiation detector to determine that initiation of a power supply voltage source for the array of memory cells has occurred at which time the data scrubbing apparatus writes the corrected data back to the memory cells and rewrites associated reference cells.

In other embodiments, a data scrubbing apparatus receives a scrub enabling signal that causes the data scrubbing apparatus to write the corrected data back to the memory cells and rewrites associated reference cells of the memory array based on a periodic timing.

In other embodiments, a data scrubbing apparatus includes a timing circuit that causes the data scrubbing apparatus to write the corrected data back to the memory cells and rewrites associated reference cells of the memory array at a programmed period of time.

BRIEF DESCRIPTION OF THE DRAWINGS

FIG. 7b is a block diagram of an SMT MRAM array of the SMT MRAM device of FIG. 7a.

FIG. 9 is a flow diagram illustrating another embodiment of a method for scrubbing disturb errors from an SMT MRAM device where an SMT MRAM array is scrubbed at a power initiation of the SMT MRAM device.

FIG. 10 is a flow diagram illustrating another embodiment of a method for scrubbing disturb errors from an SMT MRAM device where an SMT MRAM array is scrubbed at a programmable interval.

DETAILED DESCRIPTION OF THE INVENTION

Figure 1:
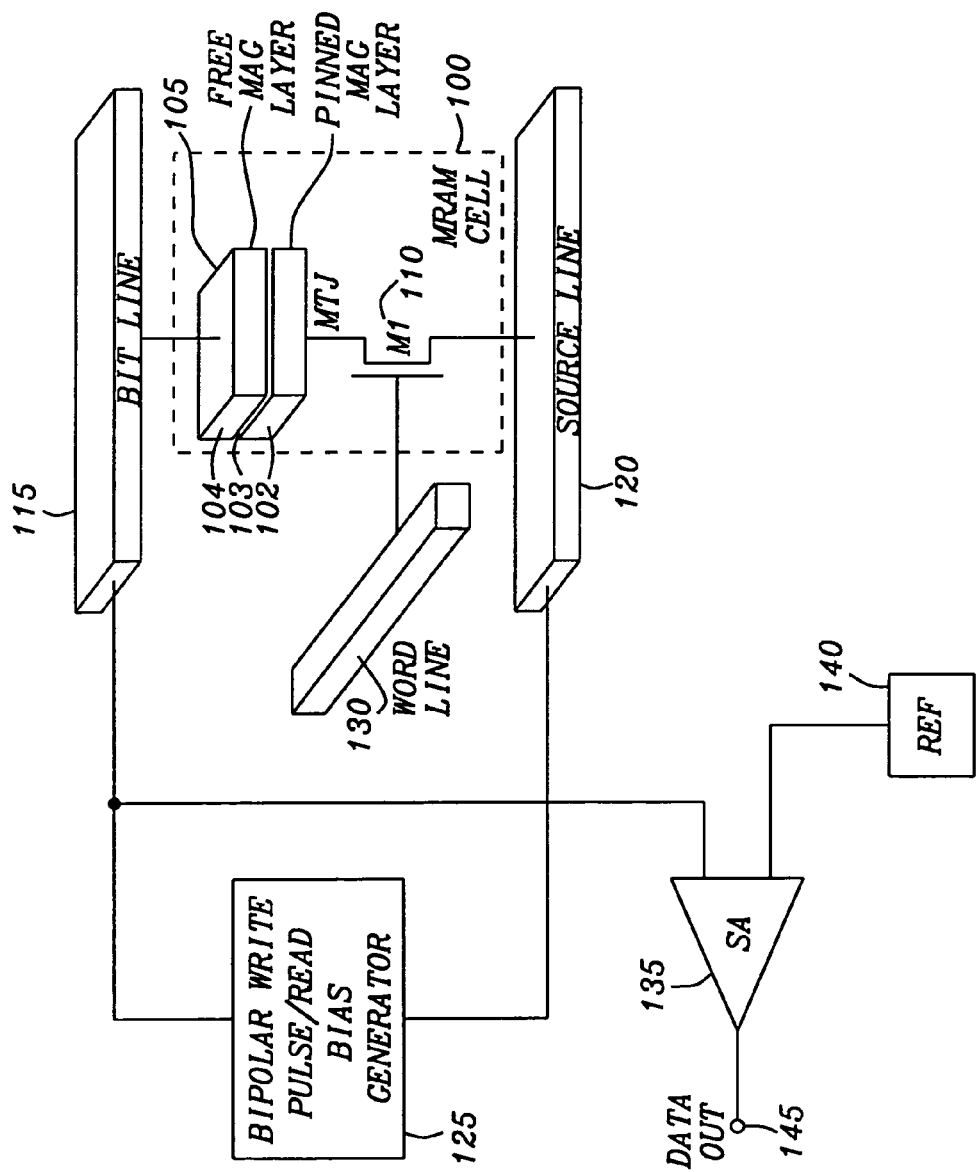
FIG. 1 is a functional diagram of a spin-torque magnetic tunnel junction memory cell and its peripheral circuitry.

As illustrated in FIG. 1, a spin moment transfer (SMT) MRAM cell 100 consists of an MTJ element 105 and a Metal Oxide Semiconductor (MOS) transistor 110. The MTJ element 105 is composed of a pinned ferromagnetic layer 102 and a free ferromagnetic layer 104, and a tunnel barrier layer 103. The drain of the MOS transistor 110 is connected through a nonmagnetic layer to the pinned ferromagnetic layer 102. The free ferromagnetic layer 104 is connected to a bit line 115 and the source of the MOS transistor 110 is connected the source line 120. The bit line 115 and source select line 120 are connected to the bipolar write pulse/read bias generator 125. The bipolar write pulse/read bias generator 125 provides the necessary programming current to the MTJ element 105 through the bit line 115 and the source select line 120. The direction being determined by logic state being programmed to the MTJ element 105.

The gate of the MOS transistor 110 is connected to a word line 130. The word line 130 transfers a word line select voltage to the gate of the MOS transistor 110 to activate the MOS transistor 110 for reading or writing the logic state of the MTJ element 105. A sense amplifier 135 has one input terminal connected to the bit line and a second input terminal connected to a voltage reference circuit 140. In various embodiments, the voltage reference circuit is a pair of SMT MRAM cells 100 programmed to opposite data states (0, 1). The pair of SMT MRAM cells 100 are read simultaneously with the selected SMT MRAM cells 100. The read voltages or currents are averaged to generate the reference voltage level applied to the second terminal of the sense amplifier 135. When the word line 115 has the word line select voltage activated to turn on the MOS transistor 110, the bipolar write pulse/read bias generator 125 generates a bias current that passes through MTJ element 105. A voltage is developed across the MTJ element 105 that is sensed by the sense amplifier 135 and compared with the output reference voltage of the reference voltage generator 140 to determine the logic state written to the MTJ element 105. This logic state is transferred to the output terminal of the sense amplifier 135 as the data output signal 145.

Reading the SMT MRAM cell 100 involves applying a voltage across the SMT MRAM cell 100 and detecting the resistance (or current) difference of the SMT MRAM cell 100. This process is similar to programming the cell 100 only at lower current level. So there is a statistical chance of the cell 100 being disturbed or rewritten. When the separation between the current level to program the cell 100 and current level needed to read the cell 100 is small, the occurrence of an SMT MRAM cell 100 being disturbed or rewritten can increase significantly. Further, the errors will accumulate with continuous reading.

To prevent failure of the SMT MRAM cell 100 from read disturb errors, a data scrubbing apparatus receives an error indication during an operation such as a read operation of a grouping of memory cells within the array of memory cells and generates an address describing the location of the grouping of the memory cells within the memory array and the error correction code bits covering the grouping of memory cells that is transferred to the array of memory cells. The data scrubbing apparatus then commands the array of memory cells to write back the corrected data to the selected group of memory cells. Other phenomena that shift the magnetic orientation of the free magnetic layer 104 such as temperature, etc. may cause the data to be disturbed as in the read operation.

Figure 2:
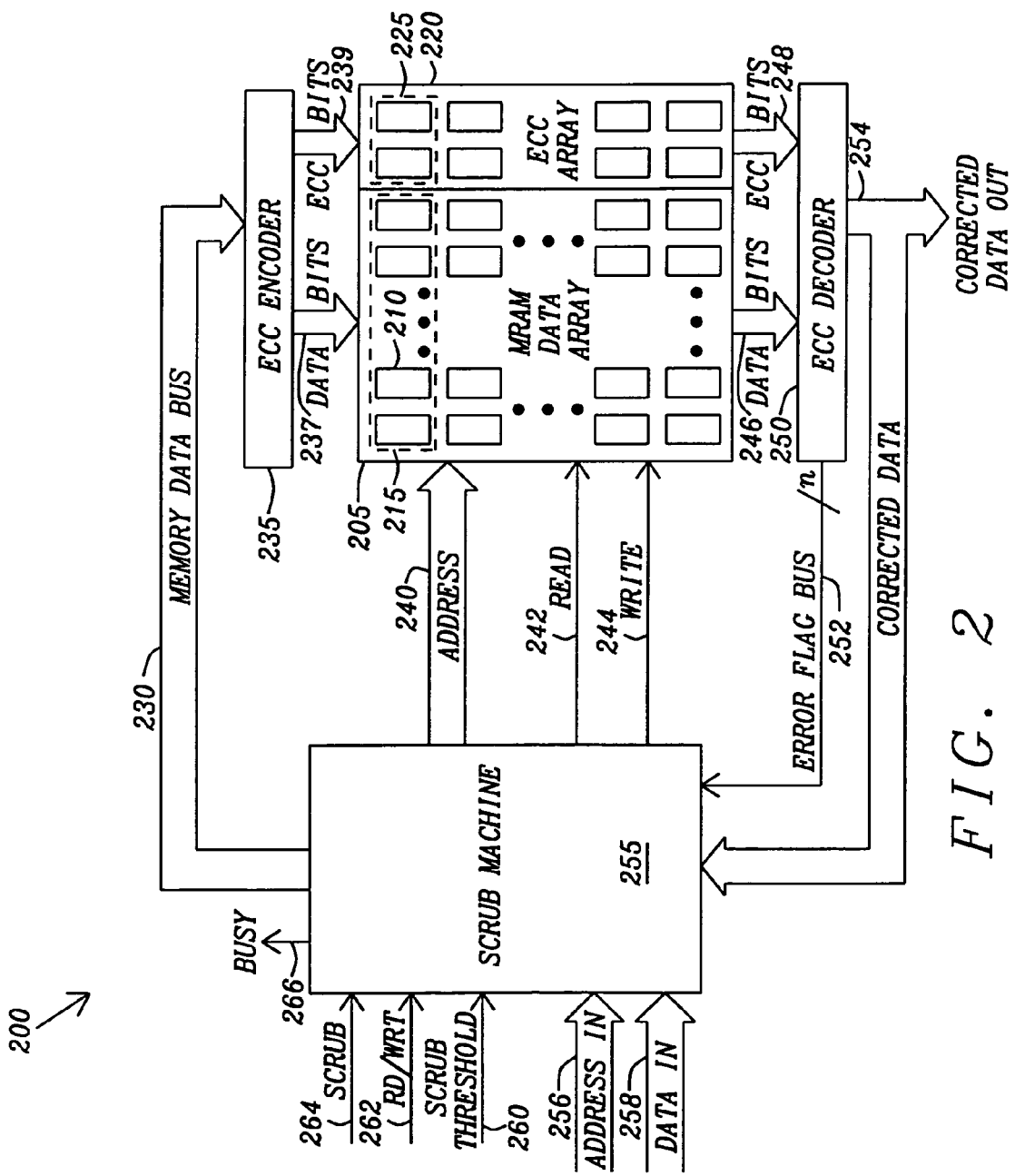
FIG. 2 is a block diagram of a SMT MRAM device including an embodiment of a scrubbing machine.

Refer now to FIG. 2 for a description of an SMT MRAM memory device 200 incorporating a data scrubbing apparatus or scrub machine 255. The scrub machine 255 is connected to an array 205 of SMT MRAM memory cells 210. The SMT MRAM memory cells 210 are arranged in rows and columns. A grouping of the SMT MRAM memory cells 210 such as the rows 215 of the SMT MRAM memory cells 210 are each covered or protected from errors by an error correction code (ECC). Error correction data is written to and retained in an ECC array 220 of SMT MRAM memory cells 210. The ECC array 220 has rows of the SMT MRAM memory cells 210 containing the error correction data for an associated grouping of the SMT MRAM memory cells 210. In this embodiment the row 215 of the array 205 of the SMT MRAM memory cells 210 is covered or protected by the grouping or row 225 of the SMT MRAM memory cells 210 into which the Error correction data is stored.

The scrub machine 255 receives an externally provided address 256 and externally provided data 258. A read/write control signal 262 determines whether the array 205 of SMT MRAM memory cells 210 is to be written to or read from.

During a write operation, the externally provided data 258 is transferred by the memory data bus 230 to the ECC encoder 235. The ECC encoder 235 generates the necessary error correction data bits 239 that are appended to the memory data bits 237 for storage at the location pointed to by the array address input 240 respectively in the memory array 205 and the ECC array 220. The read command 242 and the write command 244 are transferred to the memory array 205 for controlling the read and write operation of the memory array 205.

During a read operation, the array address input 240 is transferred to the memory array 205 to access a location containing a selected grouping (row) 215 of the SMT MRAM memory cells 210 and their associated the grouping or row 225 of ECC encoded memory cells. The data 246 from the selected grouping 215 and the associated error correction data 248 are transferred to an ECC decoder which performs an error detection operation. If there is an error in the data 246 and its associated error correction data 248, the ECC decoder corrects the data 246 and its associated error correction data 248 and transfers the corrected data 254 to external circuitry and to the scrub machine 255. If there is an error or errors in the data 246 and/or its associated error correction data 248, an error flag signal is generated and transferred on the error flag bus 252 to the scrub machine 255. The scrub machine 255 determines if the number of errors occurring at the selected location has exceeded a threshold level established by the scrub threshold value 260. The scrub threshold value 260 is generally the maximum number of errors that are detectable and correctable by the ECC decoder 250. If the number of errors exceeds the threshold level, the scrub machine 255 transfers the corrected data 254 to the memory data bus 230 to the ECC encoder 235. The ECC encoder 235 re-encodes the corrected data and transfers the encoded corrected data bits 237 and the newly re-encoded ECC bits 239 to the selected location within the memory data array 205 and the ECC array 220.

During the time that the corrected data 254 is rewritten to the memory data array 205 and the ECC array 220, the scrub machine 255 transfers a BUSY signal 266 to the external circuitry to inform the external circuitry that the MRAM device is rewriting the encoded corrected data bits 237 and the ECC bits 239 to the memory data array 205 and the ECC array 220. The external circuitry will transfer a new address 256 and new data 258 to the scrub machine 255 with a read/write signal 262. If the scrub machine 255 is in the process of re-writing encoded corrected data bits 237 and the ECC bits 239 to the MRAM data array 205 and the ECC array 220, the scrub machine 255 can halt the rewriting or hold the rewriting until the new data 258 is written to the new selected address 256. At the completion of the writing of the new data 258, the scrub machine 255 resumes the writing of the encoded corrected data bits 237 and the ECC bits 239.

A scrub signal 264 is provided to command the scrub machine 255 to scrub the memory data array 205 and the ECC array 220 to eliminate any potential errors. The scrub signal 264, in some embodiments, will command the scrub machine 255 to scrub the entire memory data array 205 and the ECC array 220. In other embodiments, the scrub signal 264, in conjunction with the address 256, commands the scrub machine 255 to scrub a selected location within the memory data array 205 and the ECC array 220. It is further within the scope of other embodiments that the scrub signal 264 and the address 256 to indicate a range of locations within the memory data array 205 and the ECC array 220 to be scrubbed by the scrub machine 255.

The number of bits in each of the groups of bits of the ECC array 220 determines the extent of coverage of the ECC code. If the ECC code is more robust, the number of errors that are able to be tolerated in the memory array 205 and the ECC array 220 can be larger. The scrub threshold signal 260 establishes a threshold of the number of errors that are to be tolerated before scrubbing a location within the memory data array 205 and the ECC array 220. Therefore, as described above, when an error flag signal that indicates an error or errors has occurred, the error flag bus 252 provides a count of the number of errors found within the selected location within the memory data array 205 and the ECC array 220. When the count exceeds the scrub threshold value 260, the selected location is scrubbed by the scrub machine 255. The error flag bus 252 is a multiple-bit bus (n) indicating the number of errors that have occurred in a given location based on the number of bits of error detection given the coverage of the ECC code Error threshold is determined each time an associated internal data bus of a particular address is being read.

In some embodiments, the scrub machine 255 scrubs the memory data array 205 and the ECC array 220 to eliminate any potential errors at certain intervals regardless how many errors at a particular address.

Figure 3:
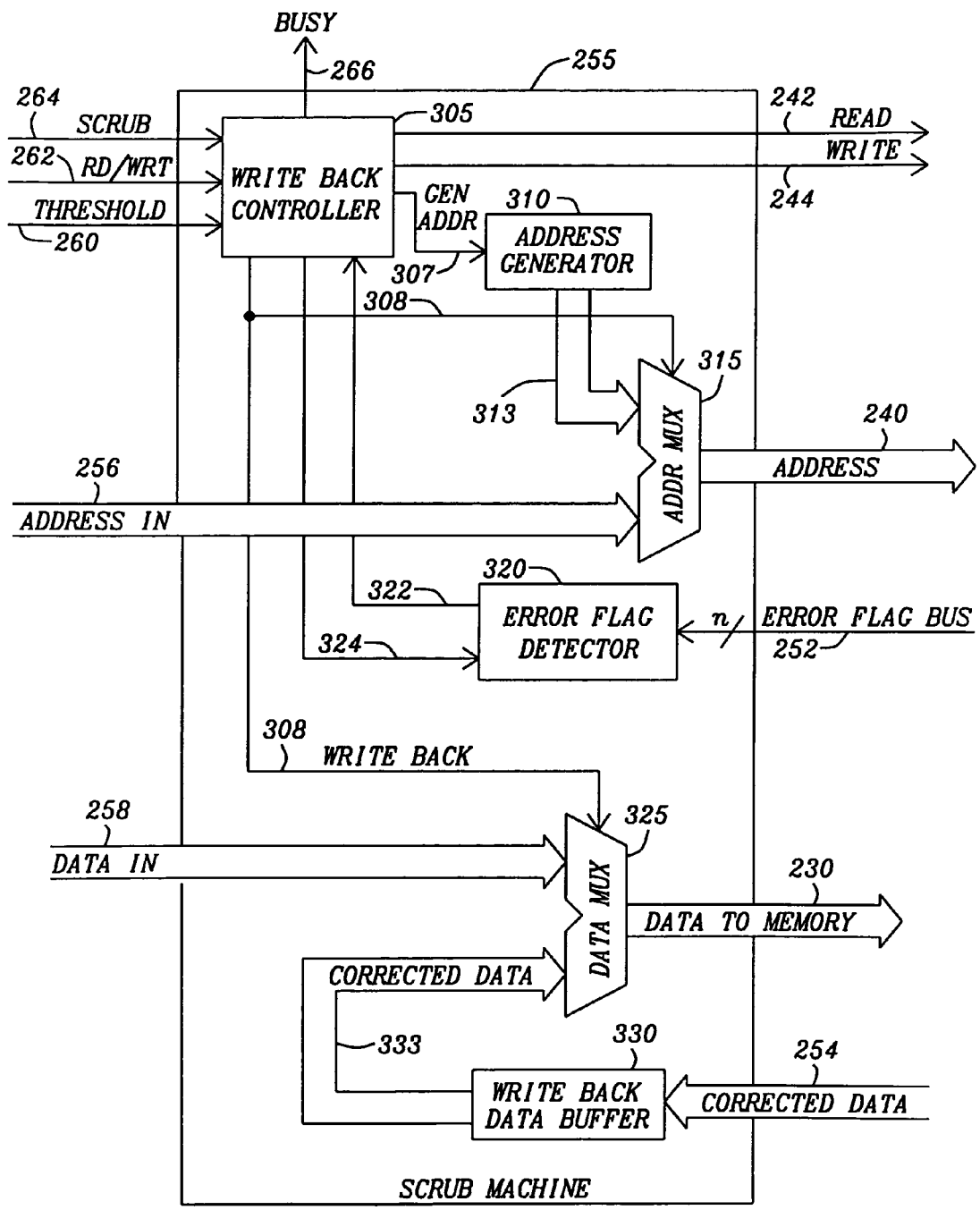
FIG. 3 is a block diagram of the embodiment of the scrubbing machine of FIG. 2.

Refer now to FIG. 3 for a discussion of the data scrubbing apparatus or scrub machine 255 of FIG. 2. The write back controller 305 provides the necessary control and timing signals for controlling the scrub machine 255 in the reading, writing, and writing back of data to the memory data array 205 of FIG. 2. The write back controller 305 receives the scrub threshold value signal 260 and sets the maximum number of errors accumulated before initiating a write process to eliminate the disturb accumulated errors from the memory data array 205 and the ECC array 220.

The read/write signal 262 determines whether memory data array 205 and the ECC array 220 is to be written to or read from. The data input 258 is transferred to a first input of the data multiplexer 325. The corrected data 254 is transferred to a write back data buffer 330. The write back data buffer maintains the corrected data pending write back to the memory data array 205. The output data 333 of the data buffer 330 is the second input to the data multiplexer 325. The write back signal 308 controls whether new data from the data input 258 or corrected data 333 is transferred at the output of the data multiplexer 325 to the memory data bus 230. When the read/write signal 262 indicates that there is a write to the memory data array 205, the data input 258 is transferred to the memory data bus 230. When the read/write signal 262 indicates that there is a data read operation and the data error flag bus 252 indicates there is an error in the read data and/or the associated error correction data and the number of errors in the data is greater than the scrub threshold, the write back signal 308 is activated and the corrected data 333 is transferred to the memory data bus 230.

When the read/write signal 262 determines that memory data array 205 and the ECC array 220 is being written to or read from, the write back signal 308 is deactivated and the address multiplexer 315 is set to transfer the address input 256 to the array address input 240. The write back controller 305 activates the read signal 242 or the write signal 244 to inform the memory data array 205 that a read or write operation is occurring.

The error flag detector 320 receives the data error flag bus 252 from the ECC decoder 250 of FIG. 2 and transfers an error count signal 322 to the write back controller 305 indicating the error count received from data error flag bus 252. The write back controller 305 compares the error count signal 322 with the scrub threshold value 260 and if the value of error count signal 322 exceeds the scrub threshold value 260, the write back controller 305 activates the write back signal 308 to transfer the corrected data 333 to the memory data bus 230. Coincidentally, the write back controller 305 activates the generate address signal 307 to cause the address generator 310 to regenerate the original address of the data having the error in the memory data array 205. The regenerated address 313 is transferred to the first input of the address multiplexer 315 and the address input 256 is transferred to the second input of the address multiplexer 315. When the write back signal 308 is activated, the address multiplexer 315 transfers the regenerated address 313 to the array address input 240.

Figure 4:
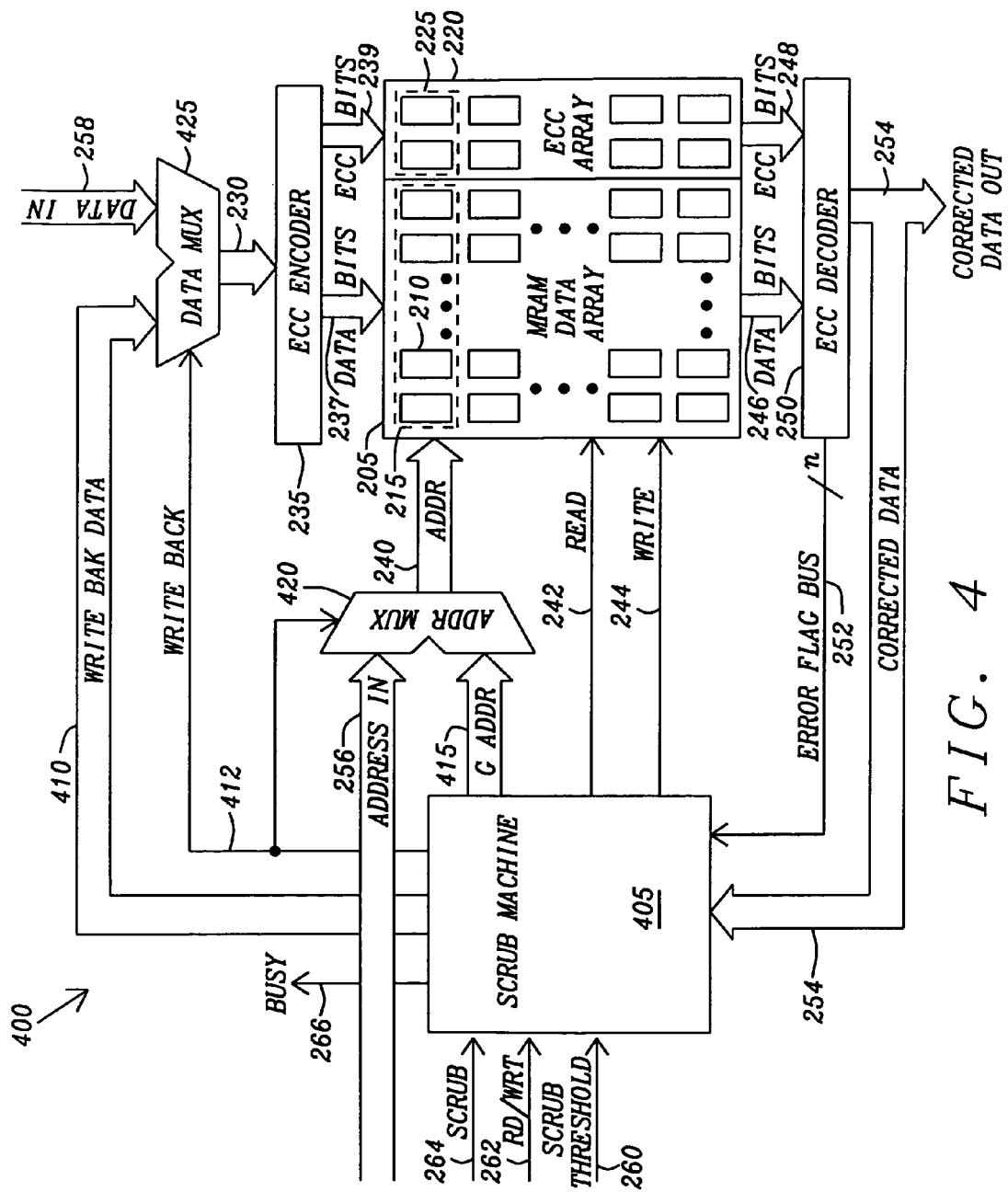
FIG. 4 is a block diagram of another embodiment of an SMT MRAM device including an alternative embodiment of the scrubbing machine.

Refer now to FIG. 4 for a description of a memory device 400 having a data scrubbing apparatus or scrub machine 405 that receives and buffers the corrected data 254. The scrub machine 405 receives the scrub threshold value 260 which is generally the maximum number of errors that are detectable and/or correctable by the ECC decoder 250 and the ECC encoder 235. When the error flag signal indicates that the ECC decoder 250 has detected and corrected an error, the scrub machine records the accumulated count of the errors at the selected location and when the number of accumulated errors has exceeded the scrub threshold value 260, the scrub machine 405 transfers the corrected data to the write back data bus 410.

The scrub machine 405 regenerates the address of the selected location of the data in the memory array 205 and the ECC array 220 having the errors. The address is transferred to the generated address bus 415 which is an input to the address multiplexer 420. The scrub machine 405 activates the write back signal 412 and the corrected data is transferred to the memory data bus 230 and the address of the selected location having the errors is transferred to the address bus 240. The scrub machine 405 activates the write signal 244 and the corrected data is written back to the selected location or the memory array 205 and the ECC array 220 to correct the stored data. During the time that the corrected data 254 is rewritten to the memory data array 205 and the associated error correction data 248 to the ECC array 220, the scrub machine 405 transfers a BUSY signal 266 to the external circuitry to inform the external circuitry that the MRAM device is rewriting the corrected data bits 237 and the ECC bits 239 to the memory data array 205 and the ECC array 220.

In a read or write operation from external circuitry, the scrub machine 405 receives a read/write signal 262 indicating that the externally provided address 256 and externally provided data 258 are to take precedence and scrub machine 405 deactivates the write back signal. In a read operation, the read signal 242 is activated and only the externally provided address is accepted by the memory array 205 and the ECC array 220. The address 240 points to the selected location and the data and appended ECC code bits are read and transferred to the ECC decoder 250. The ECC decoder 250 determines whether an error has occurred and corrects the error if possible. If the error flag bus 252 indicates that the number of errors is greater than the scrub threshold, the scrub machine 405 performs the appropriate write back function as described above.

In a write operation, the write signal is activated and the externally provided address 256 and externally provided data 258 are transferred to the memory array 205 and the ECC array 230. The externally provided data is transferred through the data multiplexer 425 to the memory data bus 230 to the ECC encoder 235 where the ECC code that is to be appended to the externally provided data is generated. After the ECC code generation, the data bits 237 and the ECC code bits 239 are transferred to the memory array 205 and the ECC array 230.

If the scrub machine 405 is in the process of performing a write back and the external circuitry activates the read/write signal, the scrub machine 405 suspends the write back process until completion of the read or write process from the external circuitry.

The external circuitry can further activate a scrub signal 256 that commands the scrub machine to eliminate errors from the memory array 205 and the ECC array 230 regardless of the level of error in the memory array 205 and the ECC array 230. The scrub signal 256 may indicate a complete scrubbing of errors in the memory array 205 and the ECC array 230 or have an encoded address range that indicate a portion of the memory array 205 and the ECC array 230 to be scrubbed of errors. The scrub machine 405 will then generate an address 415 for the initial location to be scrubbed. The read signal 242 is activated and the data from the location is extracted from the memory array 205 and the ECC array 220. If there is no error in the data, the scrub machine 405 then increments the address 415 for the next location to be scrubbed, and the data is read from the memory array 205 and the ECC array 220. This continues until the error flag bus 252 indicates the number of errors is greater than scrub threshold. When there is an error or errors, the corrected data 254 is received and buffered by the scrub machine 405 to be transferred to the write back data bus 410. The write back signal 412 is activated and the corrected data is written back to the selected location with the error to correct the error.

It should be noted that the data multiplexer 425, the address multiplexer 420, and the scrub machine 405 together perform the function of the scrub machine 255 of FIG. 2. The data multiplexer 425 and the address multiplexer 420 are now associated with the memory array 205 and the ECC array 220 and may actually have more input portals to allow multiple locations for reading data from or for writing data to the memory array 205 and the ECC array 220 as in a multi-ported memory device.

Figure 5:
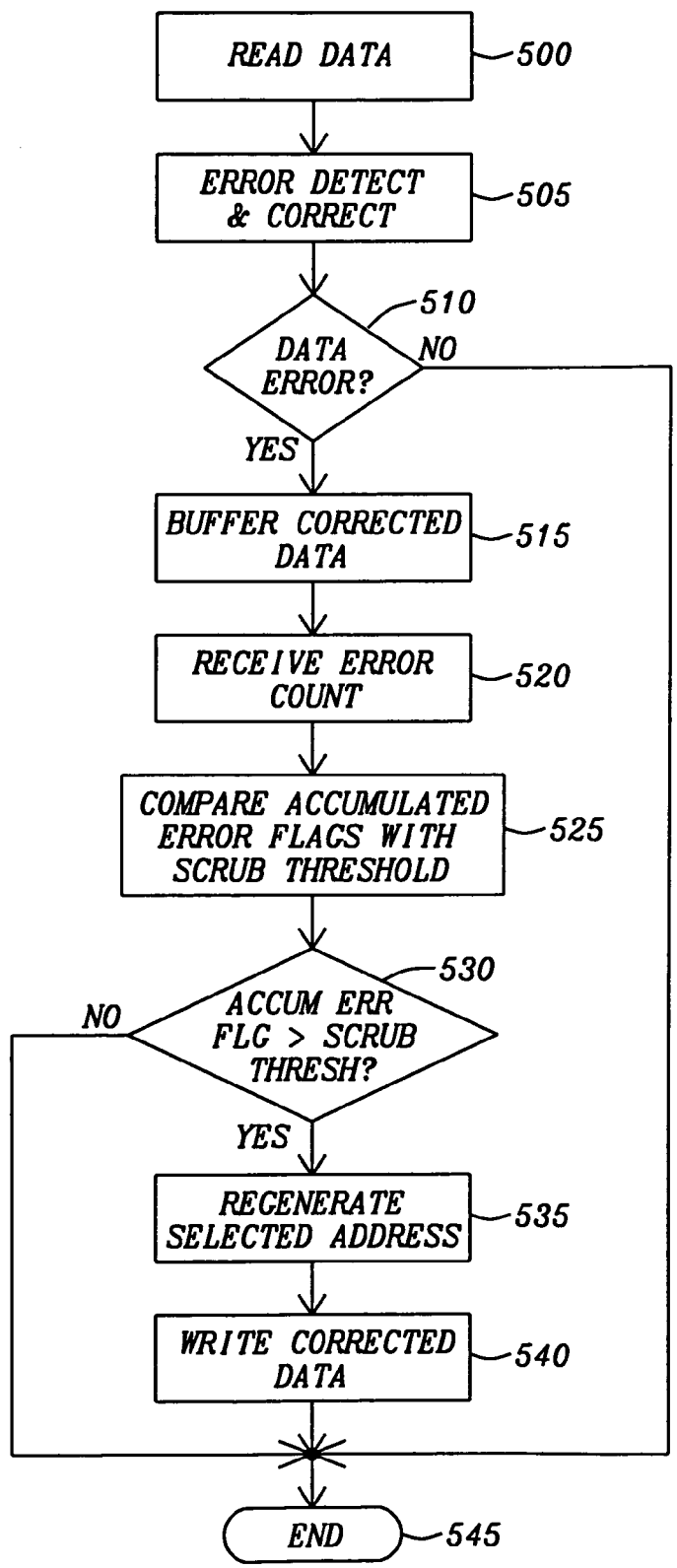
FIG. 5 is a flow diagram illustrating a method for scrubbing disturb errors from an SMT MRAM device.

Refer now to FIG. 5 for a discussion of a method for scrubbing disturb errors from an SMT MRAM device. An SMT MRAM device is read (Box 500) and the data and its appended ECC code are processed to detect and correct (Box 505) any errors within the data and appended ECC code. In the evaluation of the data and appended ECC code, an ECC flag is tested (Box 510) to determine if there has been errors corrected. If there are no errors, the process is ended (Box 545). If there are errors a scrubbing process is initiated, with the corrected data being buffered (Box 515). An error flag accumulator is incremented (Box 520) to maintain the number of errors detected within the data. The number of errors detected within the selected location is compared (Box 525) to a provided scrub threshold value. The comparison of the number of detected errors evaluated (Box 530). If the number of accumulated errors is not greater than the scrub threshold value, the process is ended (Box 545). If the number of errors is greater than the scrub threshold value, the address of the selected location is regenerated (Box 535) and the corrected data is written (Box 540) to the selected location of the SMT MRAM device. During the regeneration of the address of the selected location (Box 535) and the rewriting of the corrected data (Box 540), the BUSY signal 266 of FIG. 3 may be activated and deactivated when the process is completed (Box 545). The process is completed (Box 545) at this point and will be initiated only when a data is read (Box 500) from the SMT MRAM device.

Figure 6:
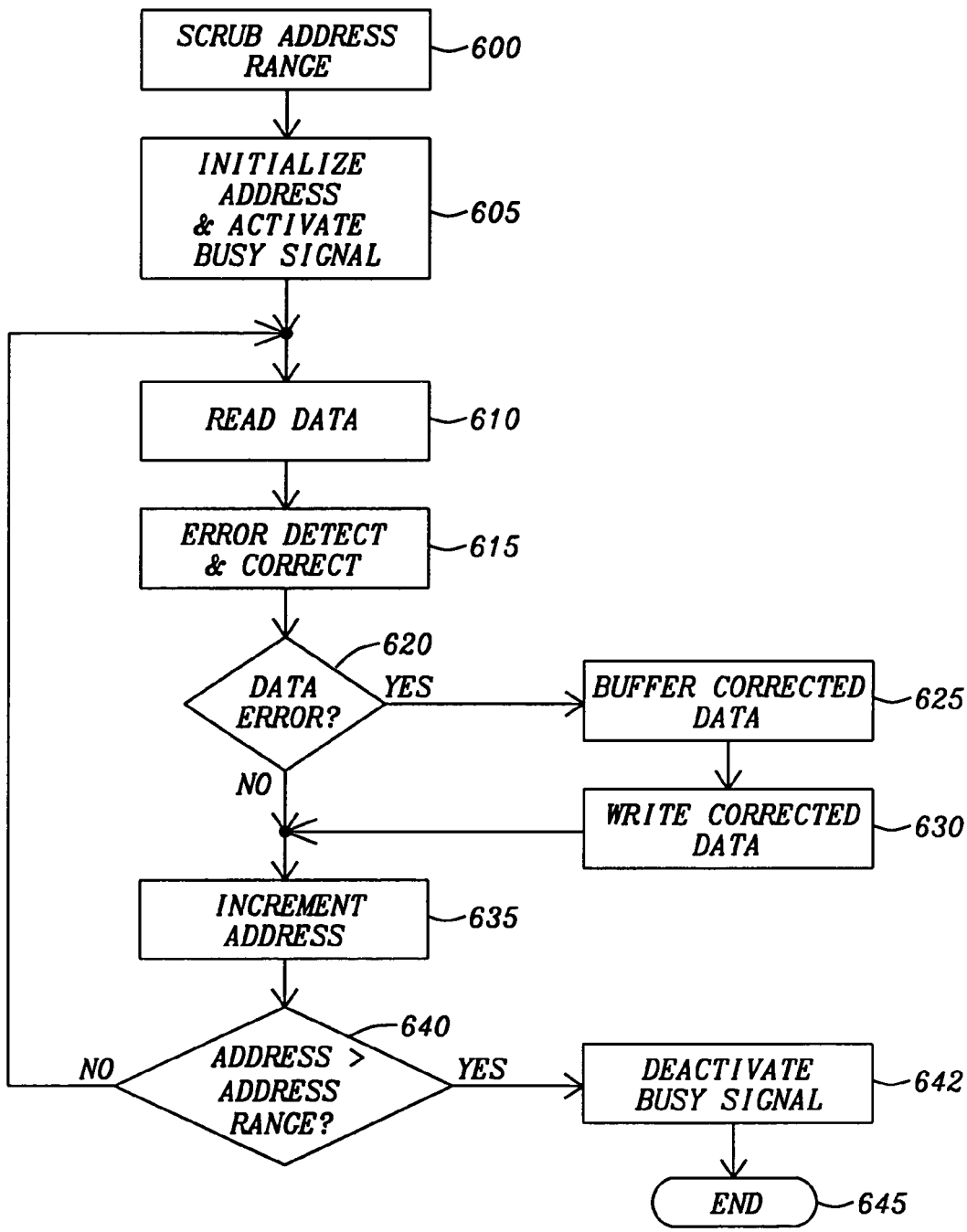
FIG. 6 is a flow diagram illustrating another embodiment of a method for scrubbing disturb errors from an SMT MRAM device where a range of addresses of the SMT MRAM device are scrubbed.

Refer now to FIG. 6 for a discussion of another embodiment of a method for scrubbing disturb errors from an SMT MRAM device. A scrub operation begins by defining (Box 600) an address range within the SMT MRAM device that is to be scrubbed. An address generator is initiated and a BUSY signal is activated (Box 605) and the data is read (Box 610) from the selected address.

The data and its appended ECC code are processed to detect and correct (Box 615) any errors within the data and appended ECC code. In the evaluation of the data and appended ECC code, an ECC flag is tested (Box 620) to determine errors were corrected. If there are errors, a scrubbing process is initiated, with the corrected data being buffered (Box 625). The corrected data is written and rewriting the reference cells (Box 630) to the selected location of the SMT MRAM device.

Upon writing the corrected data (Box 630) or if there are no errors, the address generator is incremented (Box 635). The present address within the address generator is compared (Box 640) to the maximum address of the address range. If the present address is within the address range, the data from the incremented address is read (Box 600) and the scrubbing process is repeated. If the present address is not within the address range, the BUSY signal is deactivated (Box 642) and the process is completed (Box 645) at this point and will be initiated only on command from an external control circuitry.

Figure 7A:
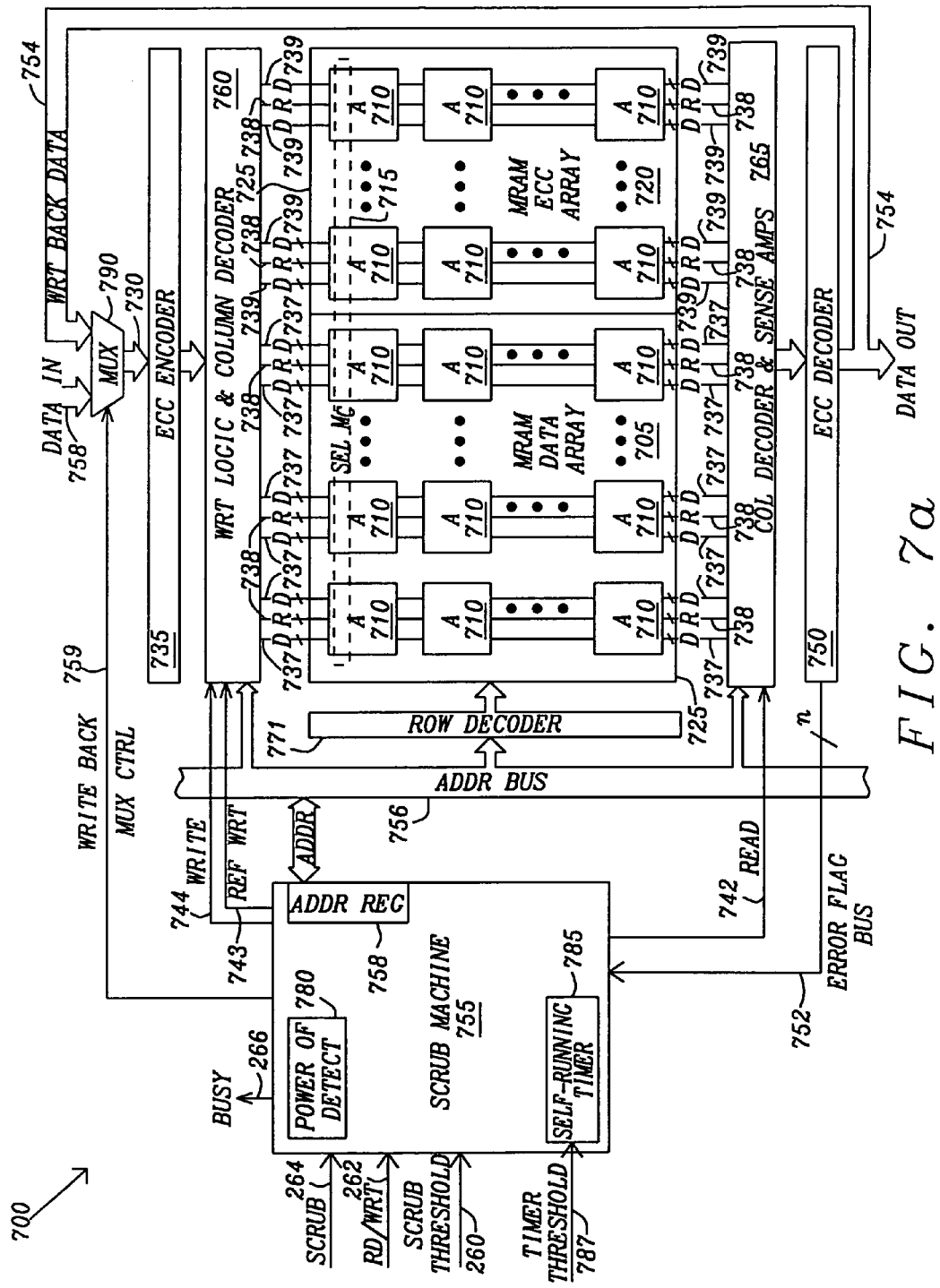
FIG. 7a is a block diagram of another embodiment of an SMT MRAM device incorporating multiple SMT MRAM arrays including an alternative embodiment of the scrubbing machine.
Figure 7B:
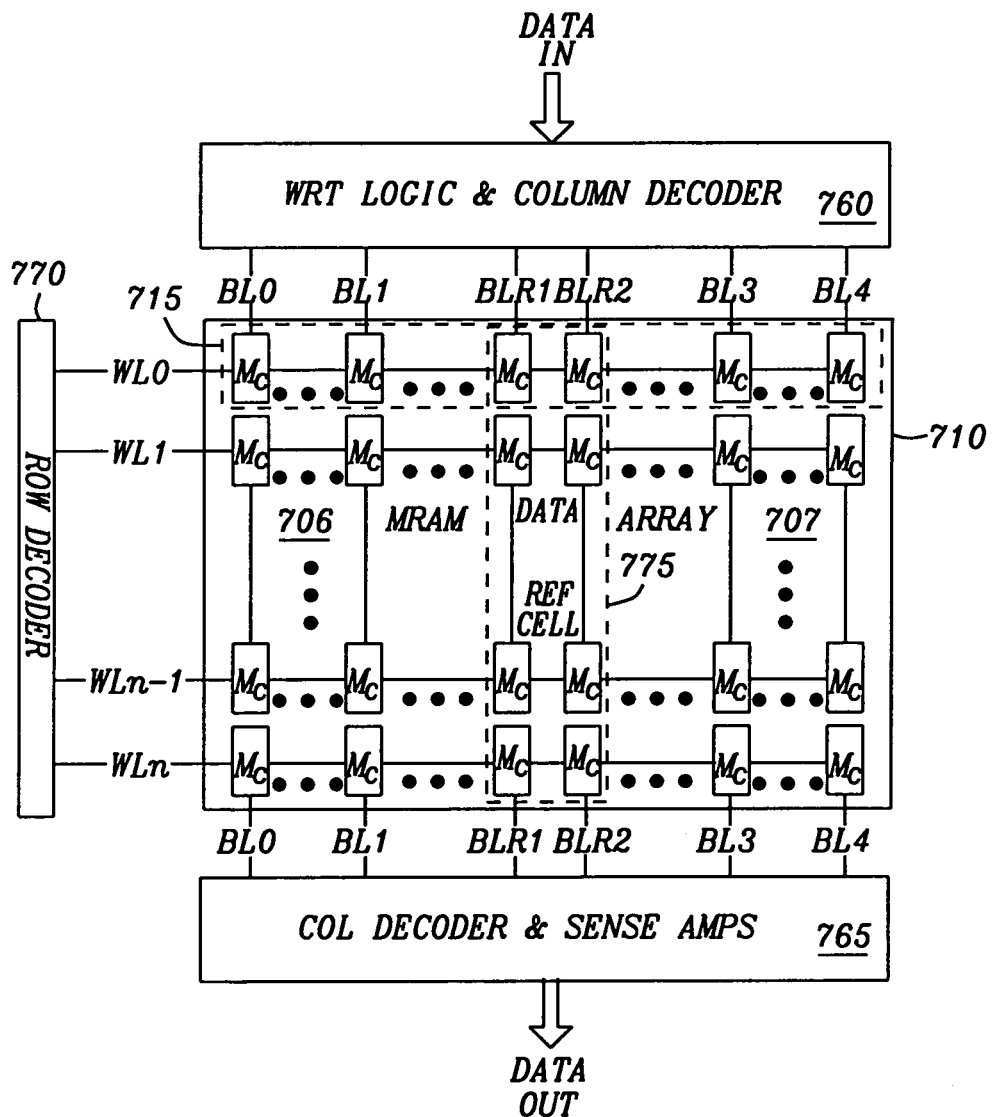

Refer now to FIGS. 7a and 7b for a description of an embodiment of an SMT MRAM memory device 700 incorporating a data scrubbing apparatus or scrub machine 755. FIG. 7a is a block diagram of the SMT MRAM device 700 incorporating multiple SMT MRAM arrays 710. The SMT MRAM device 700 has a data array 705 formed groupings of the SMT MRAM arrays 710 arranged in rows and columns. The SMT MRAM device 700 has an ECC array 720 formed of the groupings of the SMT MRAM arrays 710.

FIG. 7b is a block diagram of an SMT MRAM array 710 of the SMT MRAM device 700 of FIG. 7a. The scrub machine 755 is connected to a data array 705 and an ECC array 720 formed of the SMT MRAM memory arrays 710. The SMT MRAM memory cells MC are arranged in rows and columns to form the SMT MRAM memory arrays 710. Each column of the SMT MRAM memory cells MC are connected to one bit line BL0, . . . , BLi, . . . , BLj, . . . , BLn, and BLR1, and BLR2, The bit lines BL0, . . . , BLi, . . . , BLj, . . . , BLn, being connected for transferring of data and ECC Codes. The bit lines BLR1 and BLR2 being the bit lines for transferring the reference data for providing a reference voltage for sensing data during a read operation. The bit lines BL0, . . . , BLi, . . . , BLj, . . . , BLn, and BLR1, and BLR2 are connected to the write logic and column decoder 760 that provides the appropriate voltages for writing data to the SMT MRAM memory cells MC SMT MRAM arrays 710. The bit lines BL0, . . . , BLi, . . . , BLj, . . . , BLn, and BLR1, and BLR2 are further connected to the column decoder and sense amplifiers 765. The bit lines BL0, . . . , BLi, . . . , BLj, . . . , BLn transfer the current level representing data during a read operation and the bit lines BLR1, and BLR2 provide the current levels that are summed to provide the reference voltage or current for the sense amplifiers to detect the data. Each row of the SMT MRAM memory cells MC are connected to the word lines WL0, . . . , WLi, . . . , WLj, . . . , WLn. The word lines WL0, . . . , WLi, . . . , WLj, . . . , WLn are connected to the row decoder 770 to activate and deactivate selected rows of the SMT MRAM memory cells MC for reading and writing.

In FIG. 7a, the decoded address bus 771 is the total grouping of the word lines WL0, . . . , WLi, . . . , WLj, . . . , WLn where the row decoder 770 decodes the row address to select the row of SMT MRAM memory cells MC of the selected SMT MRAM arrays 710. Each of the SMT MRAM arrays 710 provides a single bit during the reading and the writing. The bit lines BL0, . . . , BLi, . . . , BLj, . . . , BLn, represent the bus structure of the data lines 737 and the ECC data lines 739. Similarly, the bit lines BLR1, and BLR2, connected to the reference SMT MRAM memory cells MC represent the structure of the reference cell data bus 738.

The SMT MRAM memory array 710 is further divided into half arrays 706 and 707. The half arrays 706 and 707 are separated by a column of reference cell pairs 775 that are programmed with opposite data states (0, 1). Each of the reference cell pairs 775 is associated with a grouping of the SMT MRAM memory cells MC of the two half arrays 706 and 707. The voltage or current representing the two opposite data states is averaged to determine a reference voltage or current for reading the data state of the selected MRAM memory cells MC. If any of the SMT MRAM memory cells MC within the reference cell pairs 775 are disturbed, the data cells along the selected word line WL0, . . . , WLi, . . . , WLj, . . . , WLn of the associated half arrays 706 and 707 will not be read correctly during a read operation.

A grouping of the SMT MRAM memory cells MC of each of the SMT MRAM arrays 710 of the data array 705 such as the rows 715 of the SMT MRAM memory cells MC are each covered or protected from errors by an error correction code (ECC). As shown in FIG. 7a, the selected row 715 extends over multiple data arrays 705 and multiple ECC arrays 720. Error correction data is read to and retained in an ECC array 720 of the SMT MRAM memory arrays 710. The each of the SMT MRAM arrays 710 of the ECC array 720 has rows of the SMT MRAM memory cells MC containing the error correction data for associated groupings of the SMT MRAM memory cells MC of the SMT MRAM arrays 710 of the data array 705. In this embodiment the row 715 of the arrays 710 of the SMT MRAM memory cells MC of the SMT MRAM arrays 710 of the data array 705 is covered or protected by a grouping or row 715 of the SMT MRAM memory cells MC of the ECC array 720 into which the error correction data is stored.

The scrub machine 755 receives an externally provided address from the address bus 756. The externally provided data 758 is applied to the multiplexer 790. A read/write control signal 262 determines whether any one of the arrays 710 of SMT MRAM memory cells MC is to be written to or read from. During a write operation, the externally provided data 758 is transferred by the memory data bus 730 from the multiplexer 790 to the ECC encoder 735. The ECC encoder 735 generates the necessary error correction data bits 739 that are appended to the memory data bits 737 for storage at the location pointed to by the array address input 740 respectively in the SMT MRAM arrays 710 of the data array 705 and the ECC array 720. The read command 742 and the write command 744 are transferred to the selected memory array 710 for controlling the read and write operation of the selected memory array 710.

During a read operation, the array address input is transferred from the address bus 756 to the column decoder and sense amplifier 765 and the row decoder 770. The column decoder and sense amplifier 765 and the row decoder 770 decode the array address input to access a location containing a selected grouping (row) 715 of the SMT MRAM memory cells MC of the selected SMT MRAM array 710 of the data array 705 and their associated the grouping or row of ECC encoded memory cells MC of the of the SMT MRAM arrays 710 of the ECC array 720. The data 737 from the selected grouping 715 and the associated error correction data 739 are transferred to the column decoder and sense amplifier 765. The array address from the address bus 756 is decoded to determine which of the columns of the SMT MRAM memory cells MC are to be read. The sense amplifiers within the column decoder and sense amplifier 765 compare the voltages or currents from the selected columns of the SMT MRAM memory cells MC with the voltage or current from the reference cell pair 775 associated with the selected row of the SMT MRAM memory cells MC of the selected data and ECC SMT MRAM arrays 710 to determine the data of the selected SMT MRAM memory cells MC. The sensed data is transferred to an ECC decoder 750 which performs an error detection operation. If there is an error in the data 737 and/or its associated error correction data 739, the ECC decoder corrects the data and its associated error correction data 739 and transfers the corrected data 754 to external circuitry and to the multiplexer 790 to the ECC encoder 735. If there is an error or errors in the data 737, an error flag signal is generated and transferred on the error flag bus 752 to the scrub machine 755.

As described in the embodiments of FIG. 2, the scrub machine 755 determines if the number of errors occurring at the selected location has exceeded a threshold level established by the scrub threshold value 760. The scrub threshold value 760 is generally the maximum number of errors that are detectable and/or correctable by the ECC decoder 750 and the ECC encoder 735. If the number of errors exceeds the threshold level, the scrub machine 755 transfers the corrected data 754 to the multiplexer 790 to the ECC encoder 735. The ECC encoder 735 re-encodes the corrected data and transfers the encoded corrected data bits 737 and the ECC bits 739 to the selected location within the memory data array 705 and the ECC array 720.

Figure 8:
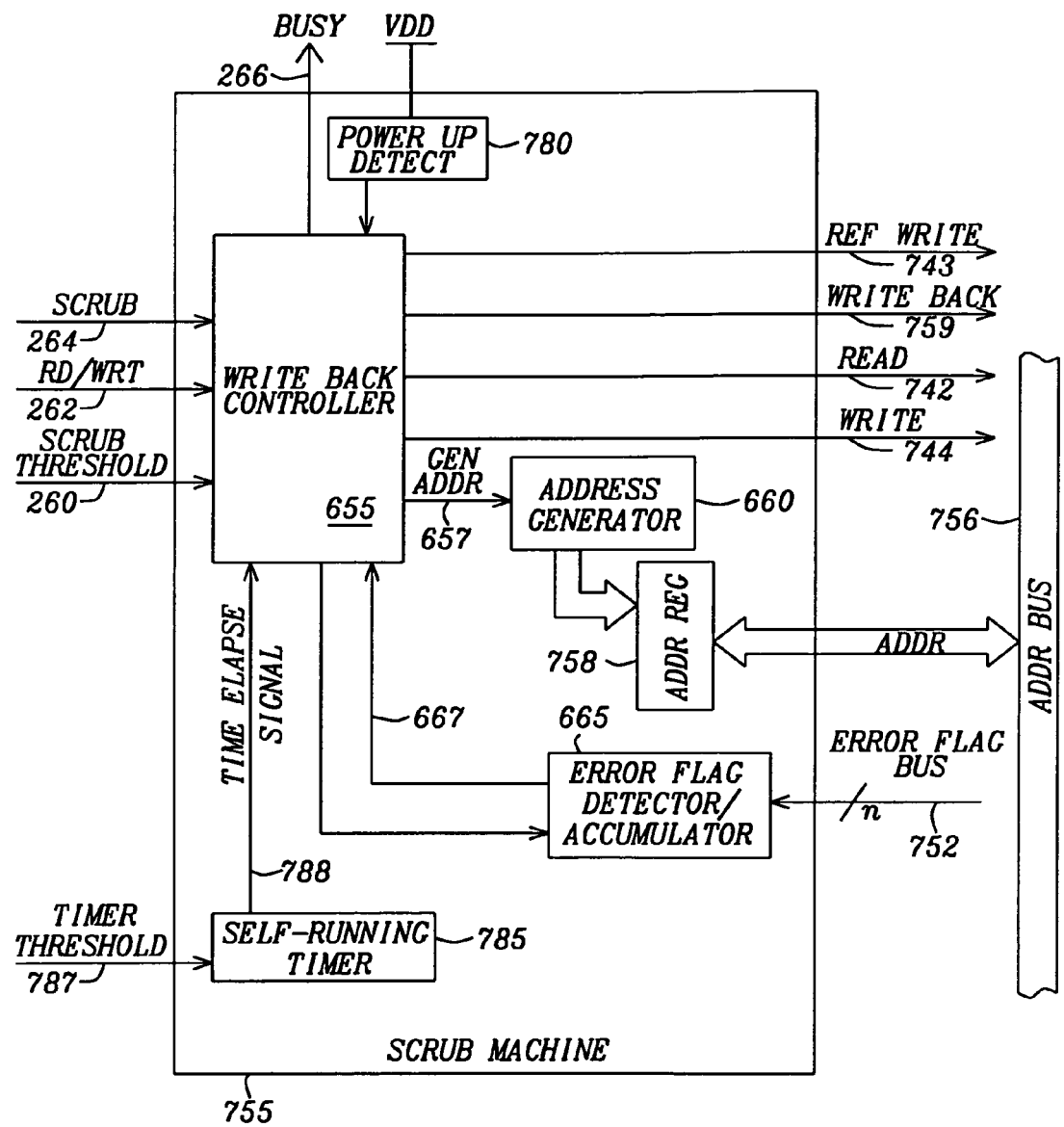
FIG. 8 is a block diagram of the embodiment of the scrubbing machine of FIG. 7.

Refer now to FIG. 8 for a discussion of the data scrubbing apparatus or scrub machine 755 of FIG. 7. The write back controller 655 provides the necessary control and timing signals for controlling the scrub machine 755 in the reading, writing, and writing back of data to the memory data array 705 of FIG. 7. The write back controller 655 receives the scrub threshold value signal 260 and sets the maximum number of errors accumulated before initiating a write process to eliminate the disturb accumulated errors from the memory data array 705 and the ECC array 720.

The read/write signal 262 determines whether memory data array 705 and the ECC array 720 is to be written to or read from. The data input 758 is transferred to a first input of the data multiplexer 790. The corrected data 754 from the ECC decoder 750 of FIG. 7 is the second input to the data multiplexer 790. The write back signal 759 from the write back controller 655 controls whether new data from the data input 758 or corrected data 754 is transferred at the output of the data multiplexer 790 to the memory data bus 730. When the read/write signal 262 indicates that there is a write to the memory data array 705, the data input 758 is transferred to the memory data bus 730. When the read/write signal 262 indicates that there is a data read operation, the read signal 742 is activated. The address from the address bus 756 is transferred to the write logic and column decoder 760, the column decoder and sense amplifier 765, and the row decoder 770 to select the desired locations of the memory data array 705 for reading.

When the read/write signal 262 determines that memory data array 705 and the ECC array 720 is being written to or read from, the write back controller 655 deactivates the write back signal 759 and the address register 758 and the address input 756 is applied directly to the write logic and column decoder 760, the column decoder and sense amplifier 765, and the row decoder 770. The write back controller 655 activates the read signal 742 or the write signal 744 to inform the memory data array 705 and the ECC array 720 that a read or write operation is occurring.

In various embodiments, the scrub machine 755 includes a self-running timer 785 that receives an external timer threshold signal 787. The external timer threshold signal programs the self-running timer 785 for a period of time between scrubbing operations of the SMT MRAM memory cells MC. The self-running timer 785 is activated and at the expiration of the programmed interval, the scrub machine 755 sets an address register to an initial address to select a row 715 within a selected SMT MRAM memory array 710 of the data array 705 for reading. The selected SMT MRAM memory cells MC are read and corrected. If there are errors, the corrected data 754 is written back to the multiplexer 790. The scrub machine activates the write back multiplex control line 759 to select the data to be written back to the selected SMT MRAM memory cells MC of the SMT MRAM arrays 710 of the data array 705 and the ECC array 720. The multiplexer 790 transfers the corrected data 754 to the ECC encoder 735. The ECC encoder 735 re-encodes the corrected data and transfers the encoded corrected data bits 737 and the ECC bits 739 to the selected location within the memory data array 705 and the ECC array 720.

In various embodiments, the scrub machine 755 includes a power up detect circuit 780 connected to the write back controller 655. The power up detect circuit is further connected to the power supply voltage source VDD for the SMT MRAM memory device 700 to determine whether the power supply voltage source VDD is activated. When the power supply voltage source VDD is activated, the write back controller 655 sets an address register 758 to an initial address to select an initial row 715 of the SMT MRAM memory cells MC of at least one of the of the SMT MRAM arrays 710 of the data array 705 and the ECC array 720 for reading. The selected SMT MRAM memory cells MC of the initial row are read and corrected. If there are errors, the corrected data 754 is written back to the multiplexer 790. The scrub machine activates the write back control line 759 to select the data to be written back to the selected SMT MRAM memory cells MC of the initial row. The multiplexer 790 transfers the corrected data 754 to the ECC encoder 735. The ECC encoder 735 re-encodes the corrected data and transfers the encoded corrected data bits 737 and the ECC bits 739 to the selected location within the memory data array 705 and the ECC array 720. A next address is selected for reading and correcting of the data and ECC bits of the next selected row of the SMT MRAM memory cells MC of the SMT MRAM arrays 710 of the data array 705 and the ECC array 720. Again if there are errors from the data and or ECC bits of the selected SMT MRAM memory cells MC, the corrected data 754 is written back through the scrub machine to the selected SMT MRAM memory cells MC through the ECC encoder 735. This process is repeated until the entire memory array 725 (the data array 705 and the ECC array 720 in combination) or a significant portion of the memory array 725 has been read, corrected (if in error) and written back, if needed.

In some embodiments, the reference cells 775 are rewritten when at least one error is detected in a selected row 715 of the SMT MRAM memory cells MC. The scrub machine activates the reference write signal 743. The write logic and the column decoder writes the appropriate data states to the reference cells 775 associated with the selected row 715 of the SMT MRAM memory cells MC.

During the time that the corrected data 754 is rewritten to the memory data array 705 and the ECC array 720 or the reference cells 775 are reprogrammed, the scrub machine 755 transfers a BUSY signal 766 to the external circuitry to inform the external circuitry that the MRAM device is rewriting the encoded corrected data bits 737 and the ECC bits 739 to the memory data array 705 and the ECC array 720 or is reprogramming the reference cells 775. The external circuitry will transfer a new address 756 and new data 758 to the scrub machine 755 with a read/write signal 762. If the scrub machine 755 is in the process of re-writing encoded corrected data bits 737 and the ECC bits 739 to the MRAM data array 705 and the ECC array 720, the scrub machine 755 can halt the rewriting or hold the rewriting until the new data 758 is written to the new selected address 756. At the completion of the writing of the new data 758, the scrub machine 755 resumes the writing of the encoded corrected data bits 737 and the ECC bits 739.

The external circuitry may have its own timing circuitry and provide the necessary timing period, rather than the self-running timer 785. A scrub signal 264 is provided to write back controller 655 to scrub the memory data array 705 and the ECC array 720 to eliminate any potential errors. The scrub signal 264, in some embodiments, will command the scrub machine 755 to scrub the entire memory data half arrays 706 and 707 and the ECC array 720. In other embodiments, the scrub signal 264, in conjunction with the address 756, commands the scrub machine 755 to scrub a selected location within the memory data array 705 and the ECC array 720. It is further within the scope of other embodiments that the scrub signal 264 and the address 756 to indicate a range of locations within the memory data array 705 and the ECC array 720 to be scrubbed by the scrub machine 755. In various embodiments, the scrub signal 264 will activate reprogramming the reference cells 775, when the scrub machine 755 is activated to scrub the selected locations within the memory data array 705.

The number of bits in each of the groups of bits of the ECC array 720 determines the extent of coverage of the ECC code. If the ECC code is more robust, the number of errors that are able to be tolerated in the memory data array 705 and the ECC array 720 can be larger. The scrub threshold signal establishes a threshold of the number of errors that are to be tolerated before scrubbing a location within the memory data array 705 and the ECC array 720. Therefore, as described above, when an error flag signal that indicates an error or errors has occurred, the error flag bus 752 provides a count of the number of errors found within the selected location within the memory data array 705 and the ECC array 720. When the count exceeds the scrub threshold value 760, the selected location is scrubbed by the scrub machine 755. The error flag bus 752 is a multiple-bit bus (n) indicating the number of errors that have occurred in a given location based on the number of bits of error detection given the coverage of the ECC code The error threshold is determined each time an associated internal data bus of a particular address is being read.

FIG. 9 is a flow diagram illustrating a method for scrubbing disturb errors from an SMT MRAM device 700 of FIG. 7 where an SMT MRAM array 705 is scrubbed at a power initiation of the SMT MRAM device 700. A power up detect circuit 780 monitors (Box 800) whether the power supply voltage source for the SMT MRAM memory device 700 is activated. If the power supply voltage source is not activated, the power up detect circuit 780 continues to monitor (Box 800) until the power supply voltage source is activated. When the power up detect circuit 780 determines that the power supply voltage source is activated the scrub machine 755 performs (Box 805) a scrub operation as described in FIG. 6.

The SMT MRAM memory device 700 proceeds to read and/or write data (Box 810) as requested until the power supply voltage source is deactivated (Box 815).

FIG. 10 is a flow diagram illustrating another embodiment of a method for scrubbing disturb errors from an SMT MRAM device 700 of FIG. 7 where an SMT is MRAM data array 705 and the ECC array 720 is scrubbed at a programmable interval. The scrub machine 755 machine determines (Box 820) if the self-running timer 785 is programmed. If the self-running timer 785 is not programmed, the scrub machine 755 receives a timer threshold signal 787 from the external circuitry and programs (Box 825) the self-running timer 785. The scrub machine 755 starts (Box 830) the self-running timer 785. The self-running timer 785 is examined (Box 835) to determine if the timer interval has elapsed. If the timer interval has not elapsed, the read/write signal 262 is examined (Box 840) to determine if a read or write operation is to be preformed. If there is no read or write operation to be performed, the self-running timer 785 is examined (Box 835) and the read/write signal 262 is examined (Box 840) until there the read/write signal 262 indicates a read or a write operation is to be performed. The scrub machine 755 then determines (Box 850) if the operation is a read or a write. If is not a read, but a write operation, the data is written to the selected SMT MRAM memory array 710. Alternately, if the operation is a read, the data is read (Box 855) from the selected SMT MRAM memory array 710 and the error detection and correction operation is performed (Box 860). The self-running timer 785 is examined (Box 835) until the timer has elapsed. The scrub operation is performed (Box 870) as described in FIG. 6.

Figure 11:
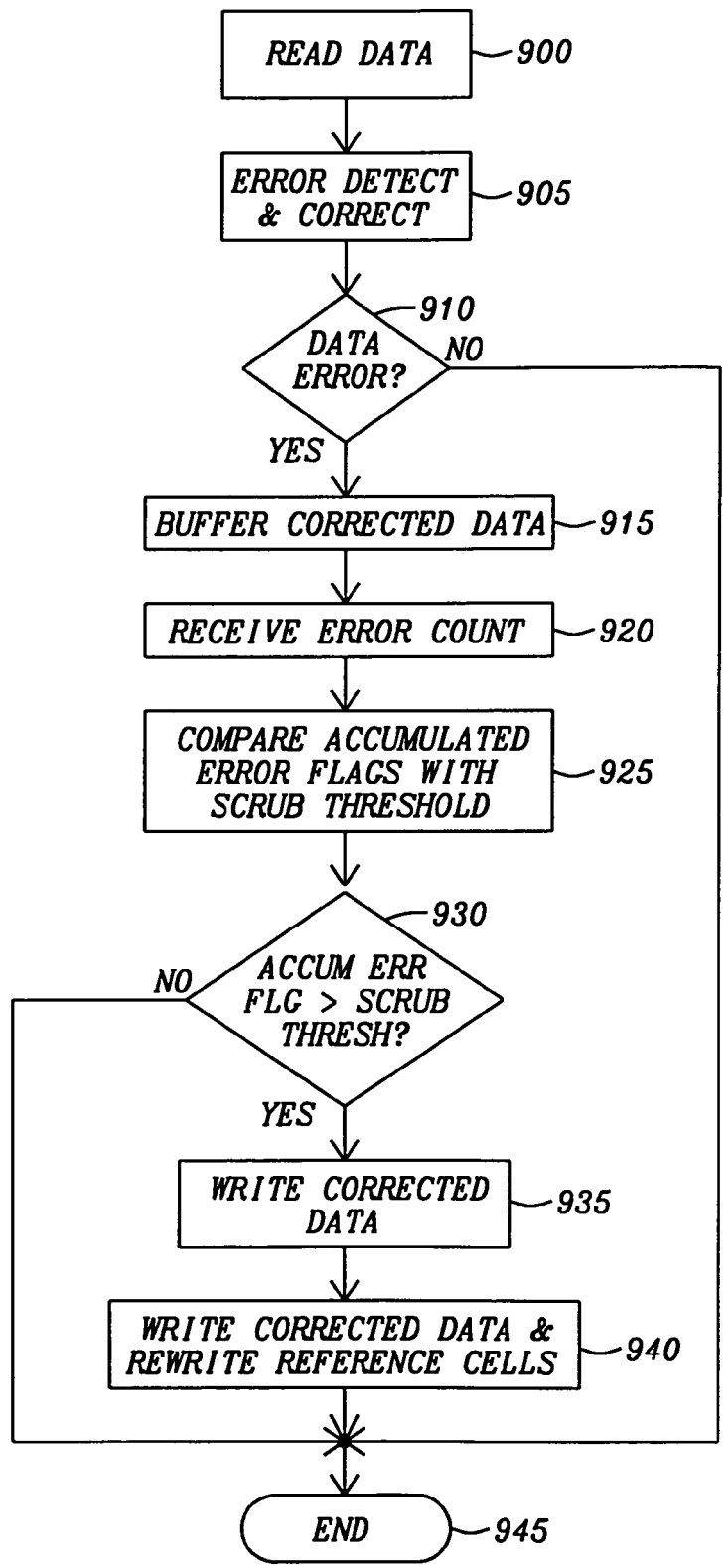
FIG. 11 is a flow diagram illustrating another embodiment of a method for scrubbing disturb errors from an SMT MRAM device.

Refer now to FIG. 11 for a discussion of a method for scrubbing disturb errors from an SMT MRAM device. An SMT MRAM device is read (Box 900) and the data and its appended ECC code are processed to detect and correct (Box 905) any errors within the data and appended ECC code. In the evaluation of the data and appended ECC code, an ECC flag is tested (Box 910) to determine if there has been errors corrected. If there are no errors, the process is ended (Box 945). If there are errors a scrubbing process is initiated, with the corrected data being buffered (Box 915). An error flag accumulator is incremented (Box 920) to maintain the number of errors detected within the data. The number of errors detected within the selected location is compared (Box 925) to a provided scrub threshold value. The comparison of the number of detected errors evaluated (Box 930). If the number of accumulated errors is not greater than the scrub threshold value, the process is ended (Box 945). If the number of errors is greater than the scrub threshold value, the address of the selected location is regenerated (Box 935) and the corrected data is written and the associated reference cells are rewritten (Box 940) to the selected location of the SMT MRAM device. During the regeneration of the address of the selected location (Box 935) and the rewriting of the corrected data and rewriting the reference cells (Box 940), the BUSY signal 266 of FIG. 3 may be activated and deactivated when the process is completed (Box 945). The process is completed (Box 945) at this point and will be initiated only when a data is read (Box 900) from the SMT MRAM device.

Figure 12:
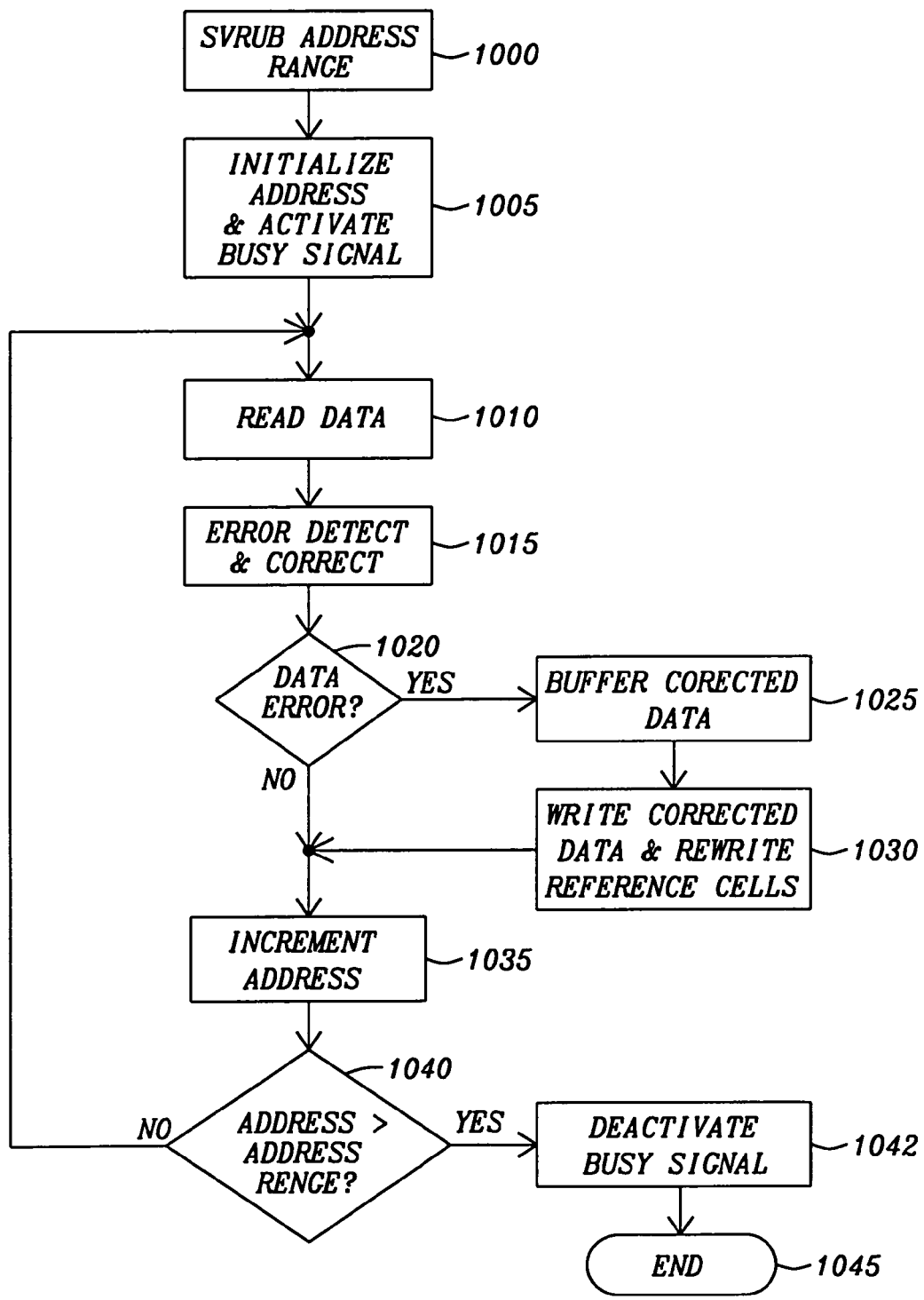
FIG. 12 is a flow diagram illustrating another embodiment of a method for scrubbing disturb errors from an SMT MRAM device where a range of addresses of the SMT MRAM device are scrubbed.

Refer now to FIG. 12 for a discussion of another embodiment of a method for scrubbing disturb errors from an SMT MRAM device. A scrub operation begins by defining (Box 1000) an address range within the SMT MRAM device that is to be scrubbed. An address generator is initiated and a BUSY signal is activated (Box 1005) and the data is read (Box 1010) from the selected address.

The data and its appended ECC code are processed to detect and correct (Box 1015) any errors within the data and appended ECC code. In the evaluation of the data and appended ECC code, an ECC flag is tested (Box 1020) to determine errors were corrected. If there are errors, a scrubbing process is initiated, with the corrected data being buffered (Box 1025). The corrected data is written and rewriting the reference cells (Box 1030) to the selected location of the SMT MRAM device.

Upon writing the corrected data the corrected data and rewriting the reference cells (Box 1030) or if there are no errors, the address generator is incremented (Box 1035). The present address within the address generator is compared (Box 1040) to the maximum address of the address range. If the present address is within the address range, the data from the incremented address is read (Box 1000) and the scrubbing process is repeated. If the present address is not within the address range, the BUSY signal is deactivated (Box 1042) and the process is completed (Box 1045) at this point and will be initiated only on command from an external control circuitry.

In memory devices such as a dynamic random access memory (DRAM), a refresh operation is performed at regular intervals to overcome any externally caused disturb errors and errors due to discharge of a data retention capacitor in each cell of the DRAM. The process of the embodiments as shown are initiated on as needed or desired basis rather than periodically. The disturb errors in the case of a memory device such as an SMT MRAM are caused as a result of the process for reading is similar to the process for programming the SMT MRAM device cell only at lower current level. Phenomena such as temperature, etc. that shift the magnetic orientation of the free magnetic layer 104 further cause the data to be disturbed as in the read operation. Thus a statistical chance of the SMT MRAM device cell being disturbed or rewritten provides for desirability of the randomness and non-regularity of the scrubbing of the disturb errors within the an SMT MRAM device according to the embodiments as described.

While this invention has been particularly shown and described with reference to the preferred embodiments thereof, it will be understood by those skilled in the art that various changes in form and details may be made without departing from the spirit and scope of the invention.

The invention claimed is:

1. A data scrubbing apparatus for correcting disturb errors occurring in an array of memory cells, the data scrubbing apparatus comprising:
a power up detection circuit for monitoring a power supply voltage source of the array of memory cells to determine when the power supply voltage source is activated, such that upon activation of the power supply voltage source, the data scrubbing apparatus selects at least one grouping of the data memory cells and associated error correction code within the memory array to be read, reads data and associated error correction bits from the grouping of memory cells, detects and corrects any errors within the data and the associated error correction bits from the grouping of memory cells and rewrites the corrected data, the associated error correction bits, and reference bits to the grouping of memory cells.

2. The data scrubbing apparatus of claim 1 further comprising an address register for selecting the grouping of the data memory cells and the error correction code memory cells within the memory array.

3. The data scrubbing apparatus of claim 1 further comprising a data multiplexer for receiving newly provided data to be written to the array of the memory cells and the corrected data and upon receiving a write back signal, transferring selectively one of the newly provided data or the corrected data to the array of memory cells.

4. The data scrubbing apparatus of claim 1 wherein the memory cells within the array of memory cells are SMT MRAM cells.

5. A data scrubbing apparatus for correcting disturb errors occurring in an array of memory cells, the data scrubbing apparatus comprising;
a self-running timer for receiving a timer threshold signal that provides a timing indicator describing a timing period that the self-running timer is to run such that when the timing period has elapsed, the data scrubbing apparatus selects at least one grouping of data memory cells and associated error correction code memory cells within the memory array to be read, reads data and associated error correction bits from the grouping of memory cells, detects and corrects any errors within the data and associated error correction bits from the grouping of memory cells and rewrites the corrected data, the associated error correction bits, and reference bits to the grouping of memory cells.

6. The data scrubbing apparatus of claim 5 further comprising an address register for selecting the grouping of the memory cells within the memory array and error correction code memory cells covering the grouping of data memory cells.

7. The data scrubbing apparatus of claim 5 further comprising a data multiplexer for receiving newly provided data to be written to the array of the memory cells and the corrected data and upon receiving a write back signal, transferring selectively one of the newly provided data or the corrected data to the array of data memory cells and associated error correction code memory cells.

8. The data scrubbing apparatus of claim 5 wherein the memory cells within the array of memory cells are SMT MRAM cells.

9. A memory device comprising:
a data scrubbing apparatus for correcting disturb errors occurring in an array of memory cells within the memory device, the data scrubbing apparatus comprising:
a power up detection circuit for monitoring a power supply voltage source of the array of memory cells to determine when the power supply voltage source is activated such that upon activation of the power supply voltage source, the data scrubbing apparatus selects at least one grouping of data memory cells and associated error correction code memory cells within the memory array to be read with their associated error correction code bits, reads data and associated error correction bits from the grouping of memory cells, detects and corrects any errors within the data and associated error correction bits from the grouping of memory cells and rewrites the corrected data, the associated error correction bits, and reference bits to the grouping of memory cells.

10. The memory device of claim 9 wherein the data scrubbing apparatus further comprises an address generator for selecting the grouping of the memory cells and the associated error correction code memory cells within the memory array.

11. The memory device of claim 9 wherein the data scrubbing apparatus further comprises a data multiplexer for receiving newly provided data to be written to the array of the memory cells and the corrected data and, upon receiving a write back signal from the address generator transferring the selectively one of the newly provided data or the corrected data, the associated error correction bits, and reference bits to the array of data memory cells and associated error correction code memory cells.

12. The memory device of claim 9 wherein a busy indicator is transferred to circuitry external to the array of memory cells during a write back of corrected data.

13. The memory device of claim 9 wherein the memory cells within the array of memory cells are SMT MRAM cells.

14. A memory device comprising:
   a data scrubbing apparatus for correcting disturb errors occurring in an array of memory cells within the memory device, the data scrubbing apparatus comprising;
   a self-running timer for receiving a timer threshold signal that provides a timing indicator describing a timing period that the self-running timer is to run such that when the timing period has elapsed, the data scrubbing apparatus selects at least one grouping of the data memory cells and associated error correction code memory cells within the memory array to be read, reads data and associated error correction bits from the grouping of memory cells, detects and corrects any errors within the data and associated error correction bits from the grouping of memory cells and rewrites the corrected data, the associated error correction bits, and reference bits to the grouping of memory cells.

15. The memory device of claim 14 wherein the data scrubbing apparatus further comprises an address generator for selecting the grouping of the memory cells and associated error correction code memory cells within the memory array.

16. The memory device of claim 14 wherein the data scrubbing apparatus further comprises a data multiplexer for receiving newly provided data to be written to the array of the memory cells and the corrected data and, upon receiving a write back signal from the address generator transferring selectively one of the newly provided data or the corrected data, the associated error correction bits, and reference bits to the array of data memory cells and associated error correction code memory cells.

17. The memory device of claim 14 wherein a busy indicator is transferred to circuitry external to the array of memory cells during a write back of corrected data.

18. The memory device of claim 14 wherein the memory cells within the array of memory cells are SMT MRAM cells.

19. A method for scrubbing disturb errors occurring in an array of memory cells comprising:
   determining that a power supply voltage source of the array of memory cells is activated;
   reading data and associated error correction bits from at least one grouping of memory cells;
   detecting and correcting any errors in the data and associated error correction bits read from the at least one grouping of memory cells; and
   writing corrected data, the associated error correction bits, and reference bits back to the at least one grouping of memory cells when the power supply voltage source is activated.

20. The method for scrubbing disturb errors of claim 19 wherein writing corrected data back to the grouping of memory cells comprises generating an address for selecting the grouping of the memory cells within the memory array.

21. The method for scrubbing disturb errors of claim 19 further comprising multiplexing newly provided data to be written to the array of the memory cells with the corrected data for transferring selectively one of the newly provided data or the corrected data to the array of memory cells.

22. The method for scrubbing disturb errors of claim 19 further comprising activating a busy indicator for transferring to circuitry external to the array of memory cells during a write back of corrected data.

23. The method for scrubbing disturb errors of claim 19 wherein the memory cells within the array of memory cells are SMT MRAM cells.

24. A method for scrubbing disturb errors occurring in an array of memory cells comprising:
   providing a timing indicator describing a timing period;
   selecting at least one grouping of data memory cells within the memory array to be read with their associated error correction code memory cells, when the timing period has elapsed,
   reading data and associated error correction bits from at least one grouping of memory cells;
   detecting and correcting any errors in the data and associated error correction bits read from the at least one grouping of memory cells; and
   writing corrected data, the associated error correction bits, and reference bits back to the at least one grouping of memory cells when the power supply voltage source is activated.

25. The method for scrubbing disturb errors of claim 24 wherein writing corrected data and associated error correction bits back to the grouping of memory cells comprises generating an address for selecting the grouping of the data memory cells and associated error correction code memory cells within the memory array.

26. The method for scrubbing disturb errors of claim 24 further comprising multiplexing newly provided data to be written to the array of the memory cells and the corrected data for transferring selectively one of the newly provided data or the corrected data to the array of memory cells.

27. The method for scrubbing disturb errors of claim 24 further comprising activating a busy indicator for transferring to circuitry external to the array of memory cells during a write back of corrected data.

28. The method for scrubbing disturb errors of claim 24 wherein the memory cells within the array of memory cells are SMT MRAM cells.

29. An apparatus for scrubbing disturb errors occurring in an array of memory cells comprising:
   means for determining that a power supply voltage source of the array of memory cells is activated;
   means for reading data and associated error correction bits from at least one grouping of memory cells;
   means for detecting and correcting any errors in the data and associated error correction bits read from the at least one grouping of memory cells; and
   means for writing corrected data, the associated error correction bits, and reference bits back to the at least one grouping of memory cells when the power supply voltage source is activated.

30. The apparatus for scrubbing disturb errors of claim 29 further comprising means for multiplexing newly provided data to be written to the array of the memory cells with the corrected data for transferring selectively one of the newly provided data or the corrected data to the array of memory cells.

31. The apparatus for scrubbing disturb errors of claim 29 further comprising means for activating a busy indicator for transferring to circuitry external to the array of memory cells during a write back of corrected data.

32. The apparatus for scrubbing disturb errors of claim 29 wherein the memory cells within the array of memory cells are SMT MRAM cells.

33. An apparatus for scrubbing disturb errors occurring in an array of memory cells comprising:
- means for providing a timing indicator describing a timing period;
- means for selecting at least one grouping of the memory cells within the memory array to be read with their associated error correction code memory cells when the timing period has elapsed;
- means for reading data and associated error correction code memory cells from at least one grouping of memory cells;
- means for detecting and correcting any errors in the data and associated error correction bits read from the at least one grouping of memory cells; and
- means for writing corrected data, the associated error correction bits, and reference bits back to the at least one grouping of memory cells when the power supply voltage source is activated.

34. The apparatus for scrubbing disturb errors of claim 33 wherein the means for writing corrected data, the associated error correction bits, and reference bits back to the grouping of memory cells comprises means for generating an address for selecting the grouping of the memory cells within the memory array.

35. The apparatus for scrubbing disturb errors of claim 33 further comprising means for multiplexing newly provided data to be written to the array of the memory cells and the corrected data for transferring selectively one of the newly provided data or the corrected data to the array of memory cells.

36. The apparatus for scrubbing disturb errors of claim 33 further comprising means for activating a busy indicator for transferring to circuitry external to the array of memory cells during a write back of corrected data.

37. The apparatus for scrubbing disturb errors of claim 33 wherein the memory cells within the array of memory cells are SMT MRAM cells.

* * * * *